United States Patent
Sanso et al.

(10) Patent No.: US 10,015,013 B2
(45) Date of Patent: Jul. 3, 2018

(54) EFFICIENT REPLICATION OF HIERARCHICAL STRUCTURES

(71) Applicant: ADOBE SYSTEMS INCORPORATED, San Jose, CA (US)

(72) Inventors: Antonio Sanso, Allschwil (CH); Tommaso Teofili, Rome (IT)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 0 days.

(21) Appl. No.: 14/334,279

(22) Filed: Jul. 17, 2014

(65) Prior Publication Data
US 2016/0019274 A1  Jan. 21, 2016

(51) Int. Cl.
G06F 17/00 (2006.01)
H04L 9/32 (2006.01)
G06F 17/30 (2006.01)

(52) U.S. Cl.
CPC ........ H04L 9/3239 (2013.01); G06F 17/3089 (2013.01); *G06F 17/30575* (2013.01); *H04L 2209/60* (2013.01)

(58) Field of Classification Search
CPC ........ G06F 17/30575; G06F 17/30578; G06F 17/30368
See application file for complete search history.

(56) References Cited

U.S. PATENT DOCUMENTS

| | | | | |
|---|---|---|---|---|
| 6,311,187 B1* | 10/2001 | Jeyaraman | ........ | G06F 17/30575 707/770 |
| 7,275,244 B1* | 9/2007 | Charles Bell | ....... | G06F 17/3089 717/168 |
| 2015/0112939 A1* | 4/2015 | Cantwell | ............. | G06F 11/1451 707/646 |

OTHER PUBLICATIONS

Improved File Synchronization, Suel et al., 20th International Conference on Data Engineering, 2004.*

* cited by examiner

*Primary Examiner* — Andrew T McIntosh
(74) *Attorney, Agent, or Firm* — Shook, Hardy & Bacon L.L.P.

(57) ABSTRACT

Embodiments of the present invention provide systems, methods, and computer storage media for facilitating efficient replication of hierarchical structures. In the regard, the number of nodes within a hierarchical structure to replicate is minimized such that the hierarchical structure is more efficiently replicated. Generally, to determine which nodes to replicate, node identifiers, such as hash values, that represent the content of the corresponding nodes can be utilized. In this manner, upon edits being made to content within a hierarchical structure, node identifiers can be updated to reflect the edited content. When a replication operation is initiated, the node identifiers for the current content existing on one computing device can be compared to the node identifiers associated with the previously replicated content on another computing device. The particular nodes to replicate can be based on any discrepancies between the corresponding node identifiers.

17 Claims, 7 Drawing Sheets

EFFICIENT REPLICATION OF HIERARCHICAL STRUCTURES

BACKGROUND

Hierarchical structures or tree structures are used to represent various types of data (e.g., pages, objects, names, values, categories, etc.) and how such data relate to one another. For example, a hierarchical structure may be used to represent an arrangement of webpages within a website. In some cases, hierarchical structures are replicated. For example, when content within a hierarchical structure is modified, the modified hierarchical structure may be replicated in order to synchronize or update data previously transmitted to another device. Replicating a hierarchical structure, however, can be a lengthy procedure, particularly when a hierarchical structure is large and/or the hierarchical structure is replicated across a network experiencing limited bandwidth.

SUMMARY

Embodiments of the present invention relate to facilitating efficient replication of hierarchical structures. In the regard, the number of nodes within a hierarchical structure to replicate is minimized such that the hierarchical structure is more efficiently replicated. Generally, to determine which nodes to replicate, node identifiers, such as hash values, that represent the content of the corresponding nodes can be utilized. In this manner, upon edits (e.g., additions, modifications, deletions) being made to content within a hierarchical structure, node identifiers can be updated to reflect the edited content. When a replication operation is initiated, rather than blindly replicating content associated with each node in the hierarchical structure, the node identifiers for the current content existing on one computing device can be compared to the node identifiers associated with the previously replicated content on another computing device. The particular nodes to replicate can be based on any discrepancies between the corresponding node identifiers. That is, for example, if a hash value of a node at a user device does not match a hash value of the corresponding node at a server, the node can be designated to be replicated to the server, while hash values that do match are not replicated to the server.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Hierarchical structures or tree structures are generally used to represent an arrangement of items, such as, for example, pages, objects, names, values, categories, or other data. Oftentimes, hierarchical structures are used to represent a large amount of data resulting in an unwieldy data structure. Replicating such a large amount of data can result in a lengthy replication operation. In particular, a lengthy replication operation may occur when replicating a large amount of data using a low bandwidth network.

One exemplary environment in which tree replication frequently occurs includes a content management system. A content management system can be used to manage any type of content, such as text files, images, or any type of content. In a content management system, a hierarchical structure can be used to arrange content. The content may be generated and/or edited at one location (e.g., remote device) and replicated such that it can exist in another location (e.g., centralized server). To assist in the management of content, some content management tools, such as the ADOBE EXPERIENCE MANAGER tool, have been developed that provide mechanisms to manage content including web content and mobile application content.

By way of example only, assume that a content management system is utilized to manage website content or mobile application content that includes multiple pages (e.g., webpages) arranged in a hierarchical structure. Further assume that an author edits a page (e.g., modifies or adds a product name or a product price) via his or her user device. Upon completing the edits, the author can elect to have the updated content published such that it can be viewed by others. In a conventional system, the author may provide an indication to activate the entire hierarchical structure so that any edits provided by the author will be published. In this regard, each page within the hierarchical structure is replicated on a server for publishing irrespective of whether the pages incurred any edits.

Embodiments of the present invention are directed to facilitating efficient replication of hierarchical structures. In this regard, embodiments described herein enable replication of portions (nodes) of a hierarchical structure that have actually been edited. As a result, replication is minimized for portions (nodes) of a hierarchical structure that have not incurred or experienced any edits even when the author may provide an indication to activate the entire hierarchical structure. In implementation, node identifiers that represent or indicate content, or a state thereof, associated with a node can be used to identify which nodes within a hierarchical structure have likely been modified. For example, node identifiers, such as hash values, can be determined for each node to represent the content associated therewith. When a node identifier (e.g., hash value) for a particular node of a hierarchical structure varies from a previous node identifier for that node, the node may be recognized as modified and, as such, be replicated.

Although a content management system is described as one exemplary embodiment in which implementations described herein may be employed, hierarchical structures, and replication thereof, can exist in any environment including other web environments or non-web environments. Further, as can be appreciated, the hierarchical structure can be associated with any amount or type of data.

Various terms are used throughout this description. Although more details regarding various terms are provided throughout this description, general definitions of some terms are included below to provider a clearer understanding of the ideas disclosed herein:

A hierarchical structure, or tree, refers to data arranged in a hierarchy structure. Hierarchical structures or tree structures are generally used to represent an arrangement of items, such as, for example, pages, objects, names, values, categories, or other data. A hierarchical structure may include a collection of nodes and links representing the data and relationships therebetween. FIGS. 2A-2D illustrate various examples of hierarchical structures.

A node refers to a tree element or element that represents data within a hierarchical structure. A node can represent any type of data or content, such as, for example, categories, pages, values, or any other type of data. A typical hierarchical structure includes a root node and an end node, or plurality thereof. A root node refers to a node that does not have, or is not linked to, a superior or predecessor node. An end node refers to a node that does not have any children or successor nodes.

A node identifier refers to any identifier that represents or indicates content or data associated with the node, or a state thereof. A node identifier may be of any value including numerals, alphabetic characters, symbols, any combination thereof, or the like. A node identifier corresponding with a node can be stored in association therewith, such as, a node property of the node. In some cases, a node identifier may be a hash value.

A hash value represents data associated with a node. Hash values are values returned by a hash function and can be used to differentiate between data. A hash value can be determined using any hash function.

Accordingly, in one aspect, an embodiment of the present invention is directed to one or more computer storage media storing computer-useable instructions that, when used by one or more computing devices, cause the one or more computing devices to perform operations. The operations include generating a hash value for a node within a hierarchical structure at a first computing device, wherein the hash value represents content associated with the node. The operations also include initiating replication of the content associated with the node to a second computing device based on the hash value for the node at the first computing device being different from a hash value for a corresponding node at the second computing device.

In another embodiment of the invention, an aspect is directed to a method. The method includes recognizing an edit made to content associated with a node of a hierarchical structure, the node having a node identifier that represents the content of the node. The method also includes in accordance with the edit made to the content associated with the node, generating a new node identifier for the node of the hierarchical structure that represents the edited content of the node, and generating a new node identifier for a parent node of the node in the hierarchical structure, wherein the new node identifier for the parent node represents the content of the parent node and the edited content of the node. The method also includes transmitting at least one of the new node identifier for the node or the new node identifier for the parent node for use in determining one or more nodes within the hierarchical structure to replicate.

A further embodiment is directed to a server comprising: one or more processors; and one or more computer storage media storing computer-useable instructions that, when used by the one or more processors, cause the one or more processors to: receive a hash value that represents content of a node within a hierarchical structure at a remote computing device; determine that the hash value received differs from a current hash value representing content of a corresponding node within a corresponding hierarchical structure at the server; and provide a request to the remote computing device to receive the content of the node of the hierarchical structure at the remote computing device.

Figure 1:
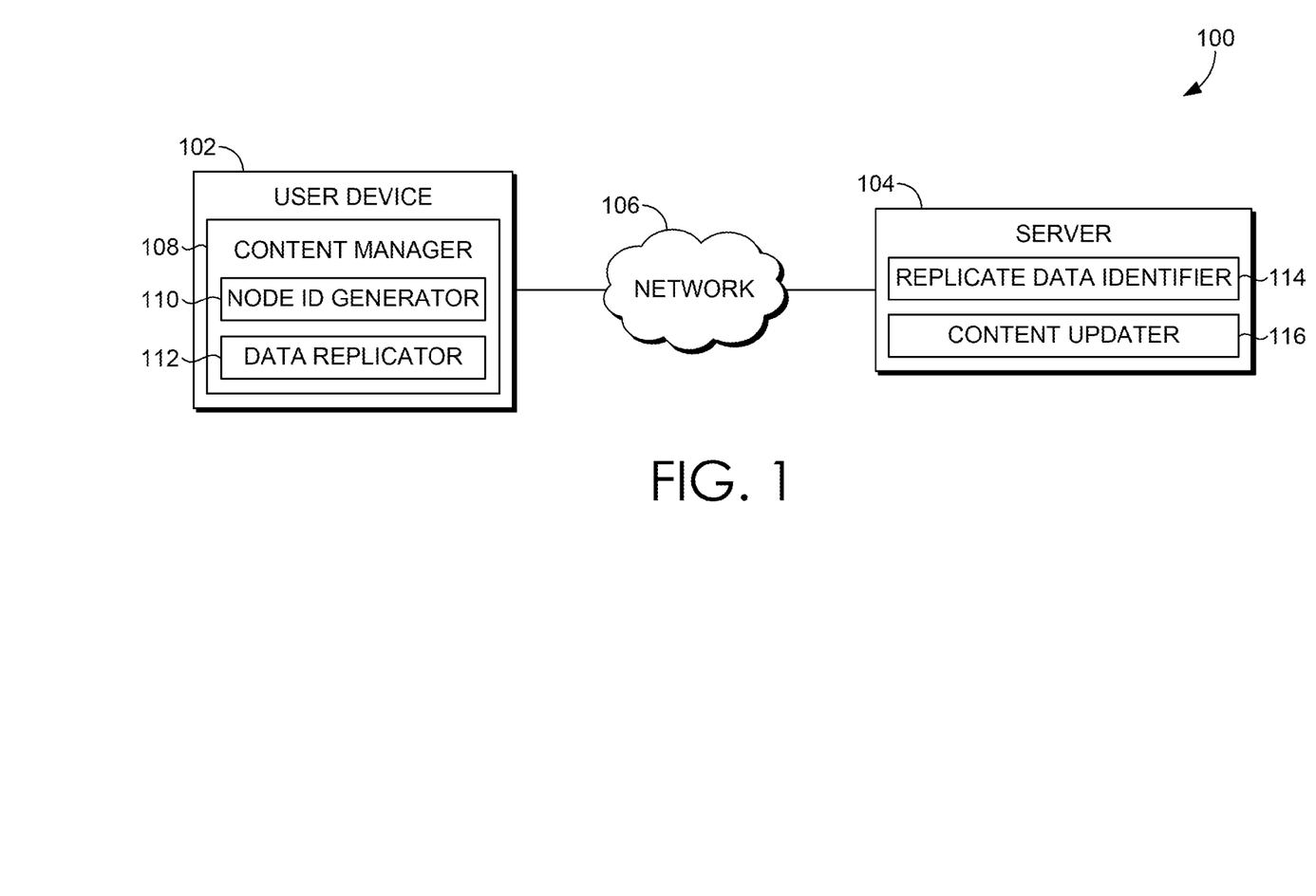
FIG. 1 is a block diagram of an exemplary computing environment suitable for use in implementing embodiments of the present invention.

Turning now to FIG. 1, a block diagram is provided illustrating an exemplary environment 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the environment 100 may include a user device 102 and a content server 104. It should be understood that the environment 100 shown in FIG. 1 is an example of one suitable computing system environment. Each of the components shown in FIG. 1 may be implemented via any type of computing device, such as computing device 600 described with reference to FIG. 6, for example. The components may communicate with each other via a network 106, which may include, without limitation, one or more local area networks (LANs) and/or wide area networks (WANs). Such networking environments are commonplace in offices, enterprise-wide computer networks, intranets, and the Internet.

It should be understood that any number of user devices and content servers may be employed within the computing environment 100 within the scope of the present invention. Each may comprise a single device or multiple devices cooperating in a distributed environment. For instance, the content server 104 may be provided via multiple devices arranged in a distributed environment that collectively provide the functionality described herein. Additionally, other components not shown may also be included within the network environment.

The user device 102 may be any device capable of generating, managing, and/or using a hierarchical structure. A hierarchical structure, or tree, refers to data arranged in a hierarchy structure. Hierarchical structures or tree structures are generally used to represent an arrangement of items, such as, for example, pages, objects, names, values, categories, or other data. A hierarchical structure may include a collection of nodes and links representing the data and relationships therebetween. A node refers to a tree element or element that represents data within a hierarchical structure. A node can represent any type of data or content, such as, for example, categories, pages, values, or any other type of data. A link refers to a relationship or a "line" between nodes or elements. A typical hierarchical structure includes a root node and an end node, or plurality thereof. A root node refers to a node that does not have, or is not linked to, a superior or predecessor node. A root node might also be referred to as a starting node. An end node, or a leaf node, refers to a node that does not have any children or successor nodes. A child node refers to a node that extends from and succeeds another node (the parent node). In contrast, a parent node refers to a node that extends from and precedes another node (the child node).

Figure 2A:
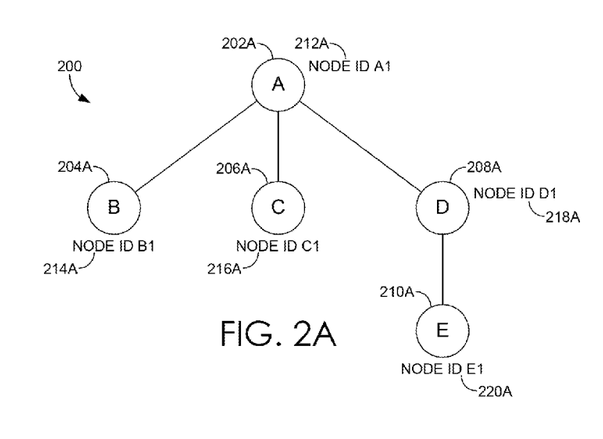
FIG. 2A is an exemplary hierarchical structure in accordance with an embodiment of the present invention.

By way of example, and with reference to FIG. 2A, FIG. 2A illustrates an exemplary hierarchical structure 200. As illustrated in hierarchical structure 200, node A 202A is a root node that does not have any superior nodes. Root node A 202A has a first child node B 204A, a second child node C 206A, and a third child node D 208A. Node D 208A has a child node E 210A. As each of node B 204A, node C 206A, and node E 210A does not have a child(s), such nodes are considered end nodes.

Although FIG. 2A illustrates an exemplary hierarchical structure in a commonly-used node-link diagram that connect nodes together with line segments, there are many ways to visually represent tree structures, including, for instance, nested sets, layered "icicle" diagrams, outlines and tree views, nested parentheses, radial trees, or the like. A nested set refers to a structure that uses enclosures to show parent relationships, such as treemaps and fractal maps. A layered "icicle" diagram uses alignment or adjacency to indicate parent relationships. An outline or tree view uses an indented list or diagram to indicate hierarchical relationships. Nested parentheses nests parentheticals within one another to indicate hierarchical relationships. A radial tree refers to a tree structure (e.g., a tree data structure) that expands outwards, radially. Any and all types of hierarchical structures are intended to be within the scope of embodiments described herein.

The user device 102 can generate, manage, or use hierarchical structures via a content manager 108. The content manager 108 is configured to facilitate generation and/or management of content. Generally, the content manager 108 can manage any type of content (e.g., pages, objects, names, values, categories, etc.) and is not limited to any type of content or data provided as an example herein.

By way of example only, the content manager 108 may facilitate management of web content, such as content associated with a website or web application. In such an embodiment, the nodes within the hierarchical structure can represent various webpages of a website. Such a content manager may enable a user or author to create and manage web and/or mobile content for presentation to other users. In this way, the content manager can provide a user interface to an author for use in creating and/or managing websites or applications, or portions thereof. As such, an author may utilize the content manager to edit content (e.g., add, modify, delete) associated with pages of a website or application. The content manger 208 may be provided via the user device 102 through a web browser, an application, an operating system, or the like operating on the user device 102.

As shown in FIG. 1, the content manager 108 may include, among other things not shown, node ID generator 110 and data replicator 112. Generally, the node ID generator 110 and the data replicator 112 can be used to implement embodiments of the present invention. Although illustrated as separate components of a content manager, any configuration can be used in various implementations. For instance, the functions described herein as being performed by the node ID generator 110, or a portion thereof, might be performed by a component that is separate from the content manager.

The node ID generator 110 is generally configured to generate node identifiers (IDs) for nodes or elements within the hierarchical structure. A node identifier refers to any identifier that represents or indicates content or data associated with the node, or a state thereof. A node identifier may be of any value including numerals, alphabetic characters, symbols, any combination thereof, or the like. A node identifier corresponding with a node can be stored in association therewith, such as, a node property of the node. Node identifiers can be used to recognize edits performed in association with corresponding nodes, as described in more detail below.

In some embodiments, a node identifier is a hash value that represents data associated with a node. Hash values (sometimes also referred to as hash codes, hash sums, or hashes) are values returned by a hash function and can be used to differentiate between data. A hash value can be determined using any hash function. A hash function may be a function used to map data of arbitrary size to data of fixed size.

In some cases, the hash function may be a cryptographic hash function (i.e., a hash function very difficult to invert, namely, recreate the input data from hash value). For instance, a MD5 message-digest algorithm is a cryptographic hash function that produces a 128-bit hash value. The hash value may be expressed in text format as a 32 digit hexidecimal number. As another example of a cryptographic hash function, SHA-1 secure hash algorithm produces a 160-bit hash value. A SHA-1 hash value is typically in the form of a hexadecimal number, 40 digits in length. MD5 and SHA-1 are provided herein only as examples of algorithms that may be used in association with embodiments of the present invention. As can be appreciated, however, any hash function or algorithm known or to be developed can be used in connection with embodiments described herein.

A node identifier(s) can be generated at any time. In some cases, a node identifier or set of node identifiers might be generated for a corresponding node(s) upon an indication provided by a user to generate a node identifier(s) or to replicate, publish, or activate a hierarchical structure, or portion thereof. For example, upon an author completing edits to a website or webpage(s), the author may select to submit or publish the edits thereby triggering the node ID generator 110 to generate node identifiers for the modified nodes, the modified nodes and nodes related thereto (e.g., parental lineage), or all nodes.

In other cases, a node identifier or set of node identifiers might be generated automatically. For example, in accordance with an edit associated with a node, such as an addition, deletion, or modification of data, a node identifier may be automatically generated for the particular node or node identifiers may be automatically generated for a set of nodes (e.g., all nodes, related nodes, etc.). In such an embodiment, the node ID generator 110, or other component, may be configured to detect edits, modifications, or additions made in association with a node (e.g., webpage) and, thereafter, initiate (without a user indication) generation of a node identifier for the corresponding node or nodes.

Irrespective of the method employed to initiate generation of a node identifier or set of node identifiers, node identifiers may be generated for any number of nodes within a hierarchical structure. In various implementations, a node identifier for a specific node (e.g., edited node) within the hierarchical structure may be initiated, node identifiers for all nodes within the hierarchical structure may be initiated, or node identifiers for a particular set of nodes within the hierarchical structure may be initiated. A particular set of nodes within a hierarchical structure for which node identifiers are to be generated may be based on relationships between nodes. For instance, as one example, when an edit to a particular node is detected, a node identifier is generated for the modified node as well as any other nodes within the parental lineage of the modified node. Parental lineage is used herein to refer to the lineage in the hierarchical structure that is parental in nature. In this regard, when an edit is detected in association with a specific node, a node identifier is generated for that node, the node's parent, the node's grandparent, etc., until the root note is reached.

By way of example only, and with reference to FIGS. 2A-2D, a hierarchical structure 200 is provided. As illustrated in FIG. 2A, node A 202A is represented with a node identifier 212A of Node ID A1, node B 204A is represented by a node identifier 214A of Node ID B1, node C 206A is represented with a node identifier 216A of Node ID C1, node D 208A is represented with a node identifier 218A of Node ID D1, and node E 210A is represented with a node identifier 220A of Node ID E1. Such node identifiers can be determined by node ID generator 110 of FIG. 1 at any time, for example, upon initial content generation.

Figure 2B:
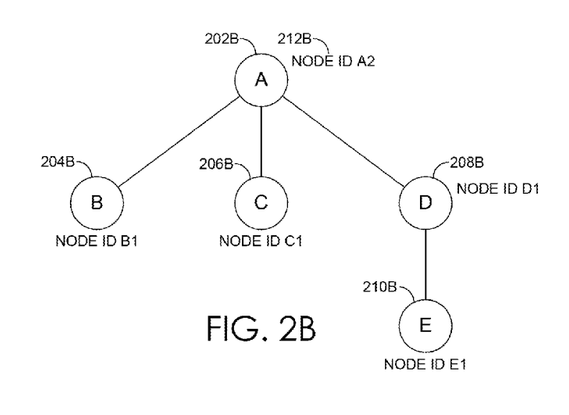
FIG. 2B is an exemplary hierarchical structure having a modified node A according to embodiments of the present invention.

Upon generating the initial node identifiers illustrated in FIG. 2A, assume that an author makes an edit to content associated with Node A 202B. In such a case, as illustrated in FIG. 2B, the node identifier 212B has been updated to Node ID A2 reflecting a modification to the content of Node A. For instance, a hash function may be applied to the updated content associated with Node A to generate the new node identifier 212B of Node ID A2. As illustrated in FIG. 2B, as Node A 202B is the root node, node identifiers associated with the other nodes 204B, 206B, 208B, and 2210B are not impacted.

Figure 2C:
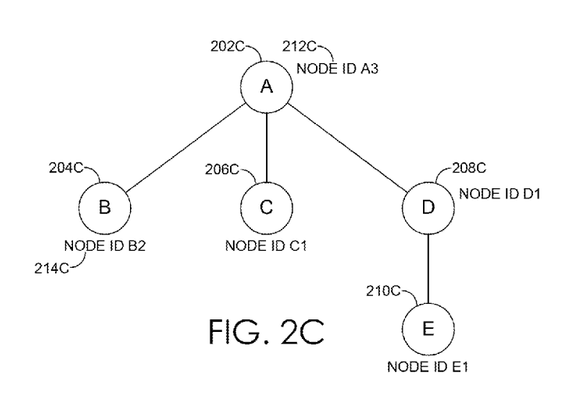
FIG. 2C is an exemplary hierarchical structure having a modified node A and modified node B according to embodiments of the present invention.

Now assume that the author edits content associated with node B. In such a case, as illustrated in FIG. 2C, the node identifier 214C for node B 204C is updated to Node ID B2. Because content associated with node B 204C was updated and/or the node identifier 214C was updated, the node identifier 212C associated with its parent, node A 202C, is updated to Node ID A3. As illustrated, node identifiers associated with the other nodes 206C, 208C, and 210 C remain the same.

Figure 2D:
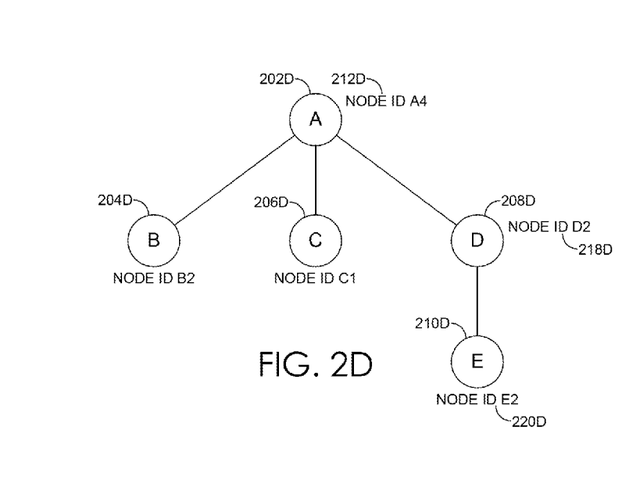
FIG. 2D is an exemplary hierarchical structure having a modified node A, modified node B, and a modified node E according to embodiments of the present invention.

Now assume that the author edits content associated with node E. In such a case, as illustrated in FIG. 2D, the node identifier 220D of Node E 210D is updated to Node ID E2. Because content associated with Node E 210D was updated and/or the corresponding node identifier 220D was updated, the node identifier 218D associated with its parent, node D 208D, is updated to Node ID D2. Similarly, the node identifier 212D associated with Node A 202D is updated to Node ID A4. The node identifier associated with Node A may be generated based on, for example, the update to the content associated with Node E and/or the update to the node identifier of Node D or Node E. As illustrated, node identifiers associated with the other nodes 204D and 206D are not affected and continue to have the same node ID as in FIG. 2C.

In some implementations, node identifiers for nodes in a hierarchical structure include an indication of content or data associated with the node itself, or a state thereof, as well as an indication of content or data associated with any child nodes or descendants of that node. As such, an end node may represent only the content of the end node, while other nodes that have a child(s) will represent the node as well as the child node(s). A node identifier incorporating an indication of content of a child(s) node may facilitate a determination of which nodes to replicate, as described more fully below.

For instance, in an embodiment where hash values are used as node identifiers, end nodes of a hierarchical structure may be the hash value of the content associated with that node. Stated differently, the node identifier for an end node may be the hash (e.g., MD5) of the node's content. For non-end nodes, the node identifier may incorporate an indication of content or data associated with any child nodes or descendants in any number of ways. In one example, a node identifier for a non-end node may be the hash of that particular node's content in combination with the hash values associated with each child of that particular node. In this way, the node identifier for a non-end node may be the hash of that node's content concatenated or combined with the hash of all of the direct children. As another example, for a non-end node, the content of the non-end node may be used in combination or concatenation with hash values associated with each child of that particular non-end node used as input to a hash algorithm, such as MD5, to obtain a node identifier for the non-end node. In yet another example, for a non-end node, the node identifier for the non-end node may be the hash of the concatenation or combination of the hash of all the direct children. Although these examples describe implementations using direct children of a node, the scope of embodiments are not intended to be limited thereto. For example, in some cases, a node identifier for a non-end node may be the hash of the concatenation of all successor children, grandchildren, etc. of a node (child lineage).

The data replicator 112 is configured to facilitate replication of data associated with the hierarchical structure. In this regard, the data replicator 112 can facilitate replication of data to the content server 104 so that the content server 104 includes data synchronized with that captured at the user device 102. Although described herein to replicate data from a user device to a content server, data can be replicated in any manner and to any device, including the user device 102, or plurality of devices.

Generally, in accordance with embodiments described herein, the data replicator 112 is used to replicate nodes of a hierarchical structure indicated as having been updated or as having a node identifier indicated as updated. In other words, the data replicator 112 seeks to minimize replication of nodes that have not been modified since the last update or replication provided to the content server 104. As such, the amount of bandwidth needed to replicate the data and the amount of time needed to do so can be reduced.

Data replication can be initiated at any time and in any manner. In some cases, data replication is automatically initiated, for example, upon detecting a modification of content associated with a node or set of nodes, upon completion of a content manager session, upon a lapse of time, or the like. In other cases, data replication is initiated upon an indication provided by a user (e.g., author). For instance, an author may select to publish or activate content including edited content. In any case, the data replicator 112 may be configured to detect or recognize when to initiate or perform data replication.

Upon recognizing to initiate or perform a data replication, the data replicator 112 can provide node identifiers associated with nodes to the content server 104. In one embodiment, the data replicator 112 can provide node identifiers associated with each node within a hierarchical structure to the content server 104. In such a case, the content server 104 may determine for which nodes data replication is desired and communicate a response to the data replicator 112 such that the data replicator 112 can provide the appropriate content to the content server 104.

In other embodiments, the data replicator 112 may provide a portion of the node identifiers to the content server 104 such that each node identifier does not need to be communicated to the content server 104. To this end, the data replicator 112 and content server 104 may enter into a negotiation process to identify nodes to replicate. In one approach, the data replicator 112 may initially communicate the node identifier of the root node to the content server 104. In such an approach, when the content server 104 determines that the node identifier has been modified or is different, the content server 104 and data replicator 112 may communicate with one another to identify a set of nodes for which content is desired to be provided to the content server 104.

Upon determining the nodes within a hierarchical structure for which to provide corresponding content to the content server 104, the data replicator 112 can transmit or initiate transmission of the content to the content server 104 via the network 106. Because not every node is necessarily replicated, the amount of data replicated is limited.

Turning now to the content server 104 of FIG. 1, the content server is generally configured to manage content. Content servers may manage any type of content, such as text files, images, or any type of content. The content server 104 can utilize a hierarchical structure to arrange content. In this way, nodes of a hierarchical structure and corresponding node identifiers can be provided to the content server for publishing to other users. Content can be provided to the content server 104 from any device, such as user device 102, or plurality of devices.

The content server 104 may include a replicate data identifier 114 and a content updater 116. Generally, the replicate data identifier 114 and the content updater 116 can be used to implement embodiments of the present invention. Although illustrated as separate components of a content server, any configuration can be used in various implementations. For instance, the functions described herein as being performed by the replicate data identifier 114, or a portion thereof, might be performed by a component that is separate from the content server 104, such as user device 102.

The replicate data identifier 114 is configured to identify nodes or data to be replicated. In this regard, nodes for which corresponding content is to be replicated from the user device 102 to the content server 104 are identified.

To determine nodes to replicate on the content server 104, the replicate data identifier 114 can utilize one or more node identifiers. As such, one or more node identifiers representing nodes of a hierarchical structure can be received from the user device 102 (e.g., data replicator 112). The replicate data identifier 114 can compare the received node identifier(s) with the node identifier(s) of the corresponding node(s) existing or stored at the content server 104, for example, previously received for publishing. When the received node identifier differs from the node identifier of the corresponding node at the content server, the replicate data identifier 114 can determine or recognize that content associated with that node should be replicated. On the other hand, when the received node identifier is the same as or matches the node identifier of the corresponding node at the content server, the node can be deemed as synchronized with the remote content.

In some embodiments, node identifiers associated with each node within a hierarchical structure are received and compared to the corresponding node identifiers existing at the content server 104. For instance, upon a user providing an indication to publish content, node identifiers corresponding with all nodes in the hierarchical structure can be transmitted (e.g., nearly simultaneously or sequentially) to the content server 104.

In other embodiments, node identifiers associated with a portion of the nodes within a hierarchical structure are received and compared to the corresponding node identifiers existing at the content server 104. By way of example only, assume that node identifiers indicate content of the node with which it is associated as well as any direct child nodes. Further assume that, initially, a node identifier associated with the root node is received. The received root node identifier can be compared to the node identifier corresponding with the root node at the content server. In the event the received root node identifier is the same as the node identifier corresponding with the root node at the content server, the root node at the content server can be deemed to be current such that synchronization of data is not needed. Further, because the root node identifier is the same, the child nodes can also be deemed to be current such that synchronization of data is not needed.

On the other hand, if the received root node identifier is not the same as the node identifier corresponding with the root node at the content server, the replicate data identifier 114 may provide an indication as such to the data replicator 112 of the user device. In response, the replicate data identifier 114 may receive node identifiers associated with each child node of the root node. The received node identifiers can be compared to the node identifiers corresponding with the children of the root node at the content server. In the event the received node identifiers are the same as the node identifiers corresponding with the children nodes at the content server, the children nodes at the content server can be deemed to be current such that synchronization of data is not needed. Further, because the root node identifier is the same, the child nodes can also be deemed to be current such that synchronization of data is not needed. As such, only the parent node is designated for replication. If, however, one of the received node identifiers is not the same as the corresponding child node identifier at the content server, the replicate data identifier 114 may provide an indication as such to the data replicator 112 of the user device. In response, the replicate data identifier 114 my receive node identifiers associated with each child node of such child node. The hierarchical structure may be traversed at each level of the hierarchy in this manner until the node identifiers associated with nodes at the content server 104 appear to match the node identifiers being received from the user device 102. As such, when a received node identifier for a node does not match the corresponding node identifier at the content server, a node identifier for each child node for the received node identifier is requested.

Upon identifying node identifiers associated with nodes at the content server that differ from corresponding node identifiers received by the user device, such nodes can be designated for replication. In this manner, the replicate data identifier 114 can designate the node or set of nodes for which updated content is desired.

The content updater 116 can provide an indication or request to the user device to access content associated with the nodes designated for replication (e.g., as designated by the replicate data identifier 114). As such, the content updater 116 may receive, retrieve, or otherwise obtain the content associated with the designated hierarchical nodes. Upon obtaining the updated content, the content updater 116 can update the content stored at the content server 104. The updated content can then be published so that other users may view the updated content.

Figure 3:
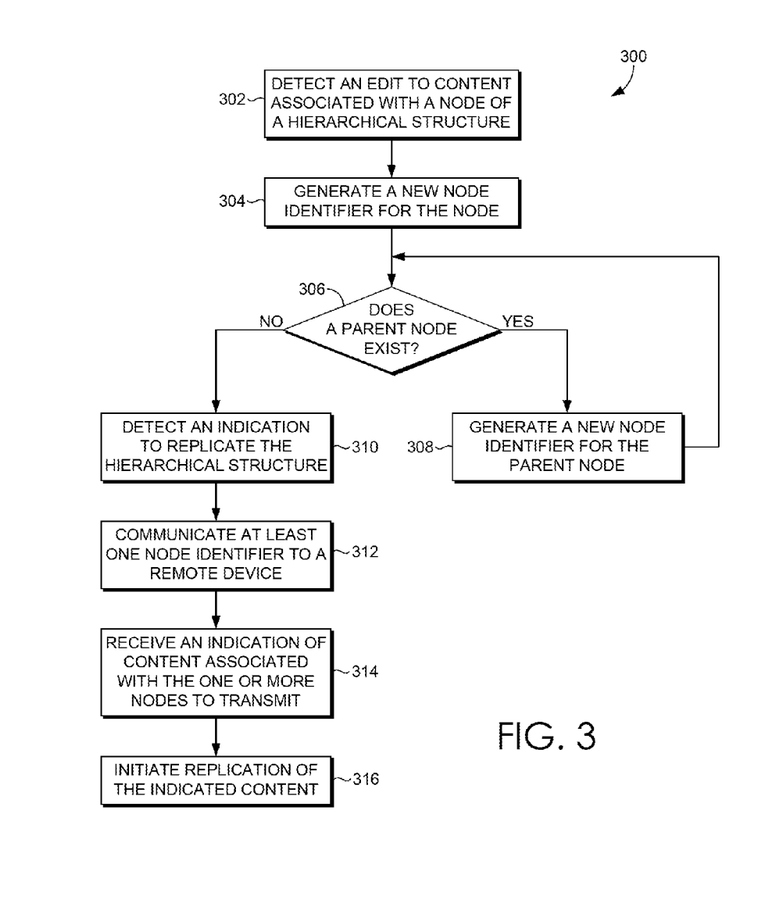
FIG. 3 is a flow diagram showing a first method for facilitating data replication in accordance with an embodiment of the present invention.

Turning now to FIG. 3, a flow diagram is provided that illustrates a method 300 for facilitating data replication. The method 300 might be performed, for example, by content manager 108 of the user device 102 in FIG. 1. Initially, at block 302, an edit to content associated with a node of a hierarchical structure is detected. Upon detecting an edit, at block 304, a new node identifier is generated for the node. Subsequently, at block 306, it is determined if a parent node exists for the node. If a parent node exists, a new node identifier is generated for the parent node, as indicated at block 308. The process continues to generate new node identifiers for parent nodes until a new node identifier is generated for the root node. In embodiments, the node identifiers can be hash values. The hash values can be generated to incorporate content or values associated with successor nodes.

Upon generating a new node identifier(s), an indication to replicate the hierarchical structure is detected. This is indicated at block 310. For example, a user may select to publish content to initiate replication of the hierarchical structure. At block 312, at least one node identifier is communicated to a remote computing device. Any number of node identifiers can be communicated to the remote computing device to facilitate determining which, if any, nodes to replicate. At block 314, an indication of content associated with one or more nodes to transmit to the remote computing device is received. Thereafter, the replication of the indicated content is initiated, as indicated at block 316.

Figure 4:
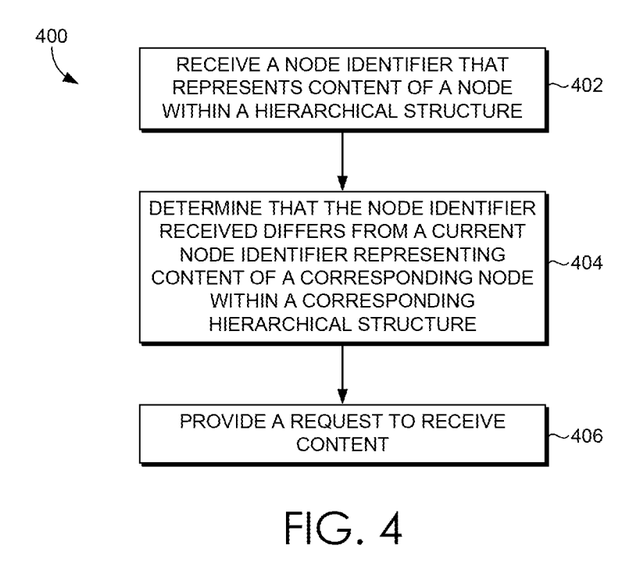
FIG. 4 is a flow diagram showing a second method for facilitating data replication in accordance with an embodiment of the present invention.

Turning now to FIG. 4, a flow diagram is provided that illustrates a method 400 for facilitating data replication, in accordance with embodiments provided herein. Such a method may be employed, for example, by a content server, such as content server 104 of FIG. 1. Initially, at block 402, a node identifier that represents content of a node within a hierarchical structure at a remote computing device is received. At block 404, it is determined that the node identifier received differs from a current node identifier representing content of a corresponding node within a corresponding hierarchical structure at a server. At block 406, a request is provided to the remote computing device to receive the content of the node of the hierarchical structure at the remote computing device.

Figure 5:
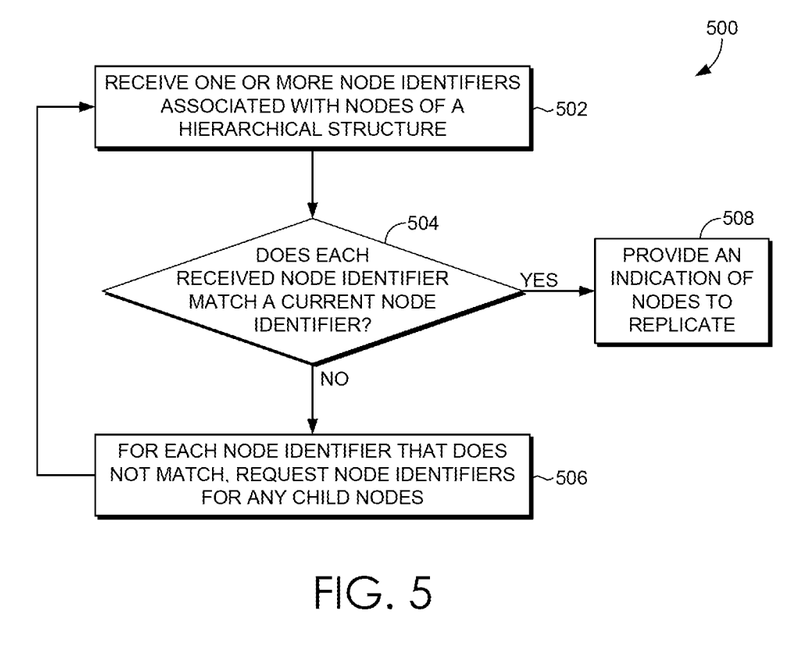
FIG. 5 is a flow diagram showing a third method for facilitating data replication in accordance with an embodiment of the present invention.

FIG. 5 is a flow diagram that illustrates a method 500 for facilitating data replication, in accordance with embodiments provided herein. Such a method may be employed, for example, by a content server, such as content server 104 of FIG. 1. Initially, at block 502, one or more node identifiers associated with nodes of a hierarchical structure are received from a remote computing device. At block 504, it is determined if the each received node identifier matches a current node identifier representing content of a corresponding node within a hierarchical structure at a server. If not, for each node having a node identifier that does not match a current node identifier of a corresponding node within a hierarchical structure at a server, node identifiers are request for any child nodes. This is indicated at block 506. The method returns to block 502 at which one or more node identifiers are received. Such a process may continue until, at block 504, each received node identifier matches a current node identifier of a corresponding node within the hierarchical structure at the server. When each received node identifier matches a current node identifier of a corresponding node within the hierarchical structure at the server, as indicated at block 508, an indication of nodes to replicate is provided to the remote computing device. For instance, an indication of the nodes associated with unmatched node identifiers can be provided to the remote computing device.

Figure 6:
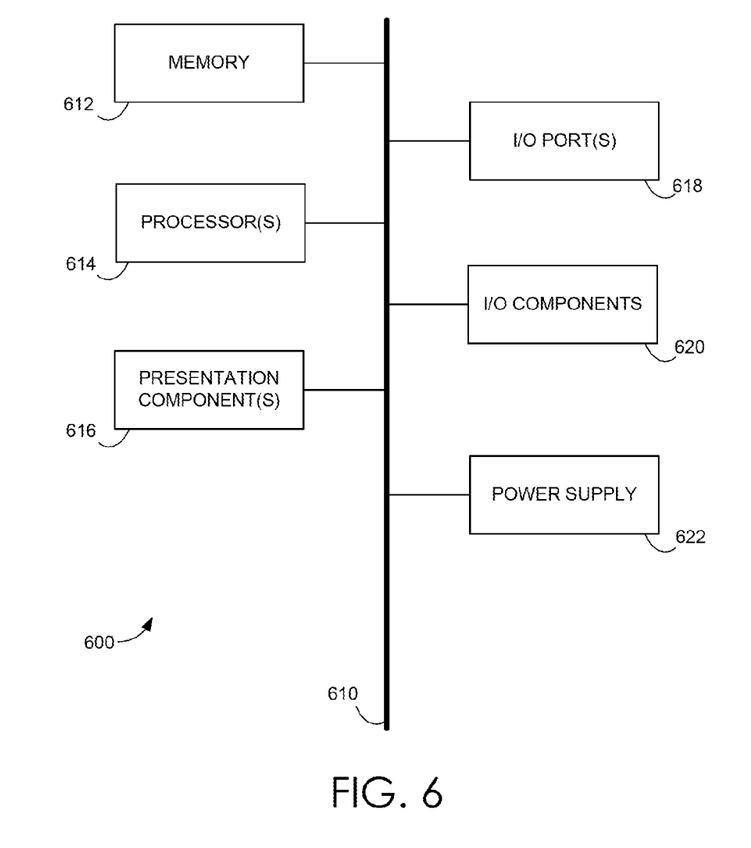
FIG. 6 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

As can be understood, embodiments of the present invention provide for, among other things, detection and/or restoration of erroneous data. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   arranging associated webpages of a website in a hierarchical structure, wherein the webpages are represented as hierarchical nodes;
   upon recognizing an edit made to content of a webpage associated with a child node of a parent node, automatically generating a first hash value for the child node and based on the automatically generated first hash, automatically generating a second hash value for the parent node within the hierarchical structure at a first computing device, wherein the second hash value represents content associated with the parent node and the child node;
   providing the second hash value for the parent node to a second computing device that determines content to replicate;
   based on the second hash value of the parent node being different from a hash value for a corresponding node at the second computing device, providing hash values associated with each child node of the parent node including the first hash value; and
   upon an election to publish the website, initiating replication of the content associated with the child node to the second computing device based on the first hash value for the child node at the first computing device being different from a hash value for a corresponding node at the second computing device, wherein replication of the content updates the webpage to reflect the edit made to the content.

2. The one or more computer storage media of claim 1, wherein generating the second hash value for the parent node within the hierarchical structure is initiated based on a lapse of a time duration.

3. The one or more computer storage media of claim 1, wherein the first hash value is generated using a cryptographic hashing function.

4. The one or more computer storage media of claim 1, wherein the first hash value represents the content associated with the child node and one or more child nodes of the child node.

5. The one or more computer storage media of claim 1, wherein the second hash value is provided to the second computing device upon a user indication to publish content associated with the hierarchical structure.

6. A method comprising:
arranging associated webpages of a website in a hierarchical structure, wherein the webpages are represented as hierarchical nodes;
recognizing an edit made to content of a webpage associated with a node of the hierarchical structure, the node having a node identifier that represents the content of the node;
upon recognizing the edit made to the content associated with the node, automatically generating a new node identifier for the node of the hierarchical structure that represents the edited content of the node, and
upon detecting the automatically generated new node identifier for the node, automatically generating a new node identifier for a parent node of the node in the hierarchical structure, wherein the new node identifier for the parent node represents the content of the parent node and the edited content of the node;
transmitting the automatically generated new node identifier for the parent node to a remote computing device for use in determining one or more nodes within the hierarchical structure to replicate;
based on the new node identifier for the parent node being different from an identifier for a corresponding node at the remote computing device, providing identifiers associated with each child node of the parent node, including the new node identifier for the node that represents the edited content of the node, to identify content to be replicated; and
upon an indication to activate the website, initiating replication of the content corresponding with the node associated with the edited content, to the remote computing device, wherein replication of the content updates the webpage to reflect the edit made to the content.

7. The method of claim 6, wherein the new node identifier for the node of the hierarchical structure is an attribute of the node.

8. The method of claim 6, wherein the new node identifier for the node of the hierarchical structure comprises a hash value.

9. The method of claim 6 further comprising providing content associated with the one or more nodes within the hierarchical structure to replicate.

10. The method of claim 6 wherein the indication to activate the website is a user indication to publish content associated with the hierarchical structure.

11. A server comprising:
one or more processors; and
one or more computer storage media storing computer-useable instructions that, when used by the one or more processors, cause the one or more processors to:
receive, from a remote computing device, an election to publish a website including a hash value that represents content of a node representing a webpage within a hierarchical structure of associated webpages of the website at the remote computing device, wherein the hash value is automatically updated upon recognizing an edit is made to the webpage;
determine that the hash value received from the remote computing device differs from a current hash value representing content of a corresponding node representing the webpage within a corresponding hierarchical structure of the associated webpages of the website at the server; and
provide a request to the remote computing device to receive the content of the node of the hierarchical structure at the remote computing device, wherein replicating the received content at the server updates the webpage to reflect edits made to the content at the remote computing device.

12. The system of claim 11, wherein based on the received hash value being different from the current hash value, receiving hash values associated with each child node of the node.

13. The system of claim 12, wherein it is determined that at least one hash value associated with at least one child node of the node differs from a corresponding hash value associated with a corresponding node at the server.

14. The system of claim 11, wherein the hash value represents the content associated with the node and one or more child nodes of the node.

15. The system of claim 11, wherein the hash value is generated using a cryptographic hashing function.

16. The system of claim 11 further comprising receive the content of the node of the hierarchical structure.

17. The system of claim 16 further comprising update the hierarchical structure at the server in accordance with the received content.

* * * * *